US012236637B2

(12) United States Patent
Ricke et al.

(10) Patent No.: US 12,236,637 B2
(45) Date of Patent: Feb. 25, 2025

(54) METHOD FOR DETERMINING OBJECT INFORMATION RELATING TO AN OBJECT IN A VEHICLE ENVIRONMENT, CONTROL UNIT AND VEHICLE

(71) Applicant: ZF CV Systems Global GmbH, Bern (CH)

(72) Inventors: Janik Ricke, Uetze (DE); Tobias Klinger, Springe (DE); Thomas Dieckmann, Pattensen (DE)

(73) Assignee: ZF CV Systems Global GmbH, Bern (CH)

( * ) Notice: Subject to any disclaimer, the term of this patent is extended or adjusted under 35 U.S.C. 154(b) by 216 days.

(21) Appl. No.: 17/929,429

(22) Filed: Sep. 2, 2022

(65) Prior Publication Data

US 2022/0414927 A1    Dec. 29, 2022

Related U.S. Application Data

(63) Continuation of application No. PCT/EP2021/055827, filed on Mar. 9, 2021.

(30) Foreign Application Priority Data

Mar. 9, 2020   (DE) .................... 10 2020 106 302.4

(51) Int. Cl.
*G06T 7/73*        (2017.01)
*B60G 17/019*    (2006.01)
(Continued)

(52) U.S. Cl.
CPC .............. *G06T 7/74* (2017.01); *B60G 17/019* (2013.01); *B60R 11/04* (2013.01); *G06T 7/579* (2017.01);
(Continued)

(58) Field of Classification Search
CPC . G06T 7/74; G06T 7/579; G06T 2207/30252; G06T 7/70;
(Continued)

(56) References Cited

U.S. PATENT DOCUMENTS 6,483,429 B1    11/2002 Yasui et al.
9,540,043 B2 *   1/2017 Lavoie .................. B62D 13/06
(Continued)

FOREIGN PATENT DOCUMENTS

DE        600 09 000 T2     3/2005
DE    10 2005 009 814 A1    9/2005
(Continued)

OTHER PUBLICATIONS

DE102008045436A1 machine translation (Year: 2008).*
(Continued)

*Primary Examiner* — Frederick M Brushaber
(74) *Attorney, Agent, or Firm* — Walter Ottesen, P.A.

(57) ABSTRACT

The disclosure relates to a method for determining object information relating to an object in an environment of a multi-part vehicle having at least one towing vehicle and at least one trailer and a control unit and vehicle associated with it, with at least one trailer camera being arranged on the trailer, having at least the following steps: capturing the environment with a trailer camera from a first position and, in dependence thereon, creating a first image having first pixels; changing the position of the trailer camera; capturing the environment with the trailer camera from a second position and creating a second image having second pixels; and, determining object information relating to an object in the captured environment.

20 Claims, 3 Drawing Sheets

(51) Int. Cl.
| | |
|---|---|
| *B60R 11/04* | (2006.01) |
| *G06T 7/579* | (2017.01) |
| *G06V 20/58* | (2022.01) |
| *H04N 23/695* | (2023.01) |
| *B60R 11/00* | (2006.01) |
| *B62D 35/00* | (2006.01) |

(52) U.S. Cl.
CPC .......... *G06V 20/58* (2022.01); *H04N 23/695* (2023.01); *B60G 2300/04* (2013.01); *B60G 2400/204* (2013.01); *B60G 2400/208* (2013.01); *B60G 2400/302* (2013.01); *B60G 2400/41* (2013.01); *B60G 2401/14* (2013.01); *B60R 2011/0092* (2013.01); *B62D 35/00* (2013.01); *G06T 2207/30252* (2013.01)

(58) Field of Classification Search
CPC ........ G06T 2207/30261; B60G 17/019; B60G 2300/04; B60G 2400/204; B60G 2400/208; B60G 2400/302; B60G 2400/41; B60G 2401/14; B60R 11/04; B60R 2011/0092; B60R 2011/004; B60R 2011/008; B60R 2300/8033; B60R 2300/8093; G06V 20/58; H04N 23/695; B62D 35/00; B62D 13/00
See application file for complete search history.

(56) References Cited

U.S. PATENT DOCUMENTS

| | | | | |
|---|---|---|---|---|
| 10,306,203 | B1* | 5/2019 | Goyal | H04N 13/128 |
| 10,699,421 | B1* | 6/2020 | Cherevatsky | G06F 18/2113 |
| 10,902,263 | B1* | 1/2021 | Angel | A61H 3/061 |
| 11,783,506 | B2* | 10/2023 | Ip | B60D 1/62 |
| | | | | 382/103 |
| 2005/0201593 | A1 | 9/2005 | Sawada et al. | |
| 2011/0043624 | A1* | 2/2011 | Haug | G06V 20/56 |
| | | | | 348/135 |
| 2015/0217693 | A1* | 8/2015 | Pliefke | H04N 7/183 |
| | | | | 348/118 |
| 2015/0286878 | A1 | 10/2015 | Molin et al. | |
| 2016/0180182 | A1* | 6/2016 | Gupta | G06V 20/58 |
| | | | | 348/148 |
| 2017/0320519 | A1 | 11/2017 | Boos | |
| 2017/0341583 | A1 | 11/2017 | Zhang et al. | |
| 2018/0040129 | A1* | 2/2018 | Dotzler | B60R 11/04 |
| 2018/0165524 | A1 | 6/2018 | Molin et al. | |
| 2018/0181142 | A1 | 6/2018 | Baran | |
| 2018/0204072 | A1 | 7/2018 | Al Rasheed et al. | |
| 2018/0276838 | A1* | 9/2018 | Gupta | G06T 7/70 |
| 2020/0133297 | A1* | 4/2020 | Ando | B62D 15/0285 |
| 2021/0027490 | A1* | 1/2021 | Taiana | B60D 1/245 |
| 2022/0019815 | A1 | 1/2022 | Molin et al. | |

FOREIGN PATENT DOCUMENTS

| | | |
|---|---|---|
| DE | 102008045436 A1 * | 3/2010 |
| DE | 10 2009 039 111 A1 | 3/2011 |
| DE | 10 2013 003 853 A1 | 9/2014 |
| DE | 10 2015 105 248 A1 | 10/2015 |
| DE | 10 2014 108 489 A1 | 12/2015 |
| DE | 10 2016 124 315 A1 | 6/2018 |
| DE | 10 2017 011 177 A1 | 6/2019 |
| WO | 2016/164118 A2 | 10/2016 |

OTHER PUBLICATIONS

K. Fintzel, R. Bendahan, C. Vestri, S. Bougnoux, S. Yamamoto and T. Kakinami, "3D vision system for vehicles," IEEE IV2003 Intelligent Vehicles Symposium. Proceedings (Cat. No. 03TH8683), Columbus, OH, USA, 2003, pp. 174-179, doi: 10.1109/IVS.2003.1212904 (Year: 2003).*
DE102013003853A1 Machine translation (Year: 2011).*
Translation of the Written Opinion of the International Searching Authority dated Jun. 1, 2021 for international application PCT/EP2021/055827 on which this application is based.
International Search Report of the European Patent Office dated Jun. 1, 2021 for international application PCT/EP2021/055827 on which this application is based.

* cited by examiner

METHOD FOR DETERMINING OBJECT INFORMATION RELATING TO AN OBJECT IN A VEHICLE ENVIRONMENT, CONTROL UNIT AND VEHICLE

CROSS REFERENCE TO RELATED APPLICATIONS

This application is a continuation application of international patent application PCT/EP2021/055827, filed Mar. 9, 2021 designating the United States and claiming priority from German application 10 2020 106 302.4, filed Mar. 9, 2020, and the entire content of both applications is incorporated herein by reference.

TECHNICAL FIELD

The disclosure relates to a method for determining object information relating to an object in an environment of a multi-part vehicle as well as to a control unit and a vehicle for carrying out the method.

BACKGROUND

It is known from the prior art how a single camera can be used to determine the structure of the scene in 3D (so-called Structure from Motion (SfM)) by means of the forward or backward movement of a vehicle on which the camera is mounted. It is also known from the prior art that the determination of the baseline between two camera positions, which for the triangulation for depth determination is either known or must be estimated, can be supported by the evaluation of odometry data of the vehicle.

US 2018/0204072A1 also provides for cameras to be fixed to a trailer of a vehicle and trailer combination. In addition, driving dynamics sensors are provided that output odometry data relating to the vehicle movement, for example, a vehicle speed. The camera data output from the camera is compared with the odometry data, wherein the odometry data is used to compensate for the vehicle movement when processing the camera data to create images. Camera data from different cameras can also be combined.

US 2005/0201593 provides for camera data to be processed together with odometry data output from wheel speed sensors in order to determine a yaw rate. U.S. Pat. No. 6,483,429 also provides an image processing method taking into account odometry data of the vehicle in order to assist the driver when parking. In US 2015/0286878, US 2018/0165524 and US 2022/0019815, an image from a first camera is processed together with an image from a second camera in conjunction with odometry data, wherein the cameras can be arranged on a trailer and a towing vehicle of a multi-part vehicle. The images acquired by the various cameras and output in the form of camera data are combined. A combined image of the environment is generated as a result, wherein during cornering a bending angle is allowed for which characterizes the positions of the cameras in relation to one another. A bird's eye view can be taken over the entire multi-part vehicle to display the area surrounding the vehicle, for example to provide parking assistance.

US 2018/0181142 discloses an omni-directional camera, which captures object points of objects in an environment of the vehicle and outputs camera data depending on them. With the aid of a control unit in the vehicle, the camera data is processed by incorporating recorded odometry data, wherein the odometry data, for example, from wheel speed sensors, position sensors or a steering angle sensor, are received via the data bus of the vehicle. The object points in the environment of the vehicle that are of interest are detected by the camera and a distance to the object assigned to the detected object point is determined by the control unit on the basis of the odometry data. For this purpose, a plurality of images are acquired using the one camera, with the images being acquired from different positions with overlapping fields of view. By tracking object points, triangulation and bundle adjustment can be used to estimate depth information in the scene. The camera data is also displayed in the form of images on a display for the driver. The images and the distance determined facilitate the maneuvering of a passenger car as a towing vehicle to a trailer in order to connect it. Other objects such as the ground, pedestrians, et cetera, can be detected, but this presupposes sufficient movement of the vehicle, as this is the only way to set different positions for the camera.

The disadvantage is therefore that it is not possible, for example, to detect persons located on the ground when at a standstill or at very low, unresolvable speeds. There are also other types of objects in the vehicle environment that cannot be detected by "structure from motion" when the vehicle is not moving or only moving very slowly. This means that no spatial detection of the environment of the vehicle or an object can be achieved with only one camera when the vehicle is at a standstill, so that it is not possible to perform either automated classification of objects or distance determination.

However, the safety requirements for driverless industrial vehicles, in accordance with ISO 3691-4 for example, require the detection of persons located on the ground, so that they must be detected before starting the vehicle, that is, at a standstill or at very low speeds. Even at a traffic light or in a parked situation, no measurements of the distance or object classifications can be made, nor can additional spatial object information of an object be determined using the known systems.

SUMMARY

It is an object of the disclosure to specify a method for determining object information relating to an object, which enables a spatial observation of the vehicle environment as accurately and reliably as possible with only one camera mounted on a trailer. It is an additional object to specify a control unit and a vehicle.

The aforementioned objects can be achieved via methods, control units and vehicles in accordance with the disclosure.

Therefore, a method of the generic type is provided for determining object information relating to an object in an environment of a multi-part vehicle including at least one towing vehicle and at least one trailer, with at least one trailer camera being arranged on the trailer, having at least the following steps:
  capturing the environment with the at least one trailer camera from a first position and, depending on this, creating a first image having first pixels;
  changing the position of the at least one trailer camera;
  capturing the environment with the at least one trailer camera from a second position and, depending on this, creating a second image having second pixels, the first position being different from the second position due to an intervening change in the position of the trailer camera;
  determining object information relating to an object in the captured environment by:

selecting at least one first pixel in the first image and at least one second pixel in the second image, by selecting the first pixel and the second pixel in such a way that they are assigned to the same object point of the object in the captured environment, and determining object coordinates of the assigned object point from first image coordinates of the at least one first pixel and from second image coordinates of the at least one second pixel by triangulation assuming a base length between the two positions of the trailer camera, the base length between the two positions being determined based on odometry data of the vehicle, wherein the odometry data characterizes an adjustment of the trailer camera between the two positions.

The disclosure provides that the odometry data include a bending angle between the at least one trailer and the at least one towing vehicle and/or are dependent on the bending angle. It is therefore already advantageously ensured that the determination of the base length by means of odometry will be more accurate, since the bending angle is also used as supplementary information. This can provide further information regarding the movement of the trailer, which was not available from the data previously used for odometry, for example a steering angle or wheel speed signals.

Accordingly, the speed characteristics of the wheels cannot reliably be used to indicate that the trailer has been pivoted, for example during a shunting procedure or during a parking procedure, nor therefore to indicate an accurate positioning of the trailer or trailer camera between the two positions. This is due in particular to the fact that the wheels of the trailer will rub or slip on the road surface during steering movements, which makes it impossible to make reliable inferences about a turning movement. Nor can the actual movement of the trailer be reliably inferred from the steering angle of the towing vehicle. In this respect, by taking into account the bending angle, the odometry can produce more accurate results with respect to the base length, which means that more reliable information on the depth information of an object can also be provided by structure-from-motion.

Preferably, it can be provided that the bending angle is determined by means of an active bending angle sensor at a coupling point between the at least one towing vehicle and the at least one trailer, for example on a kingpin or a trailer coupling, and/or depending on images captured by a camera on the towing vehicle and/or the trailer.

This allows variable determination of the bending angle, wherein an active bending angle sensor enables a very simple, reliable and cost-effective determination of the bending angle.

It can preferably also be provided that the odometry data is additionally generated depending on an adjustment distance, wherein the at least one trailer camera is adjusted by the adjustment distance by controlling an active actuator system on the trailer without changing a driving condition of the vehicle. The driving condition is defined as the movement state of the vehicle in its entirety, that is, for example, stationary or driving at a certain vehicle speed. The active actuator system does not change this movement, so the adjustment distance is not linked to the driving movement of the vehicle, so that the active actuator system differs from a drive system or a braking system, which directly affect the movement state of the entire vehicle.

It is thus advantageously ensured that a depth information or object information can also be determined with only one trailer camera, regardless of the driving condition of the vehicle. This means that, even when the vehicle is stationary or when the vehicle speed is so low that no reliable inference can be made about the movement between the two positions from odometry data, triangulation can be used to determine the depth information or an approximation to the 3D position or the object coordinates of the respective object point. This only requires controlled activation of the active actuator system, which is independent of the vehicle movement. The adjustment of the camera via the active actuator system can also be used in addition to the vehicle movement in order to be able to adjust the trailer camera in other directions, for example, for the structure-from-motion procedure.

This means that the actuator system for adjusting the trailer camera between the positions is not only limited to times when the vehicle is stationary or traveling at low speeds. This means that an additional adjustment by the adjustment distance can be made via the active actuator system even while driving. This means that the object information can be determined more flexibly or in different driving conditions or driving situations.

The adjustment distance can therefore be used in addition to the vehicle movement (if available) when determining the depth information or the object coordinates, if this adjustment distance is taken into account in addition to the standard odometry data, and according to the invention the bending angle, which affect the driving condition of the vehicle. This means that the object information or depth information can be determined more precisely and flexibly, or in different driving situations.

It is preferably also provided that a camera adjustment system is controlled as the active actuator system, which includes actuating motors and/or pneumatic cylinders and/or hydraulic cylinders and/or electric servo cylinders, wherein the at least one trailer camera is directly attached to the camera adjustment system so that when the camera adjustment system is controlled the at least one trailer camera is adjusted by the adjustment distance to change the position of the at least one trailer camera. This means that in accordance with one embodiment, the trailer camera can be adjusted directly without also moving the vehicle or parts of the vehicle, wherein the camera adjustment system is then mounted on the vehicle and aligned accordingly.

It is preferably also provided that an active air suspension system with air springs (ECAS) or a chassis adjustment system is controlled as the active actuator system, wherein by controlling the active air suspension system or the chassis adjustment system a vehicle body is adjusted in height by the adjustment distance so that the at least one trailer camera fixed to the vehicle body is adjusted indirectly by the adjustment distance to change the position of the at least one trailer camera.

This means that an actuator system that is already present in the vehicle can advantageously be used and can thus fulfil a dual function, that is, for example, it can raise and lower the body of the vehicle for air suspension, stabilization (rolling, tilting), et cetera, and can also direct the trailer camera to the different positions. The air suspension system or chassis adjustment system needs only to be controlled in the appropriate situation for this purpose, which is possible in all driving situations, including in particular when stationary. In this case, the trailer camera can be mounted freely on the vehicle body in order to move with it.

Furthermore, it is preferably also provided that a component adjustment system is controlled as the active actuator system, wherein by controlling the component adjustment system a component of the vehicle, such as an aerodynamic component, is adjusted by the adjustment distance so that the at least one trailer camera attached to this component is adjusted indirectly by the adjustment distance to change the position of the at least one trailer camera.

This means that an actuator system can be used that does not raise and lower or adjust the entire vehicle body, but only individual components or parts. Such adjustment systems are already available in certain vehicles, so that they do not need to be retrofitted. The trailer camera then only needs to be fixed to this component.

The active actuator systems mentioned can be provided individually or in combination with one another, for example to increase the variability and to enable combined adjustments with extended adjustment distances, if necessary.

It can also be provided that the object coordinates or the object information for a plurality of object points are determined from the at least two images by triangulation and an object contour and/or an object shape is determined from the plurality of object points. The object can preferably be divided into object classes based on the object contour and/or the object form. This makes it easy to recognize and classify objects, in particular stationary objects, for example, persons.

In accordance with a further embodiment, it is provided that a plurality of trailer cameras are provided and that object information relating to an object is determined from the basic length using each trailer camera independently of one another according to the described method. Thus, the depth information or object information can preferably be determined from a plurality of sources, thereby increasing the reliability. This also makes it possible to check the plausibility of the object information determined from the plurality of trailer cameras.

It is preferably also provided that more than two images are acquired at different positions and from each acquired image, pixels are selected which are assigned to the same object point of the object in the captured environment, wherein object coordinates of the assigned object point are determined from the image coordinates of the selected pixels by triangulation assuming a base length between the respective positions of the trailer camera. This means that the respective object or respective object point can also be tracked for a longer time in order to determine the depth information or the respective object information more accurately or more reliably from it, if necessary by means of bundle adjustment. Multiple pixels can also be combined to form one or more feature points and the temporal correspondence of this or these feature points(s) between the individual images can be determined by triangulation.

It can additionally be provided that the determined object information, which follows from an adjustment of the trailer camera by the adjustment distance by means of the active actuator system or from the adjustment distance as odometry data, is plausibility checked with object information which follows from odometry data of the vehicle, which is selected from the group including: wheel speed signal and/or vehicle speed and/or steering angle and/or bending angle and/or transmission data, these including in particular a transmission speed and the engaged gear. This allows object information about an object derived from different movements of the trailer camera to be compared. If, for example, the vehicle speed is very low, the reliability of the depth information determined from wheel speeds and bending angles can no longer be guaranteed, for example in the case of passive wheel speed sensors, so that in addition to the plausibility check the trailer camera is adjusted by the adjustment distance using the active actuator system and the depth information can be obtained from this.

According to the invention, a control unit and a vehicle equipped with such a control unit are also provided for carrying out the described methods, wherein the vehicle is multi-part and has at least one towing vehicle and at least one trailer, with a bending angle being formed between the towing vehicle and the trailer and at least one trailer camera being arranged on the trailer.

BRIEF DESCRIPTION OF THE DRAWINGS

The invention will now be described with reference to the drawings wherein.

DESCRIPTION OF THE PREFERRED EMBODIMENTS

Figure 1:
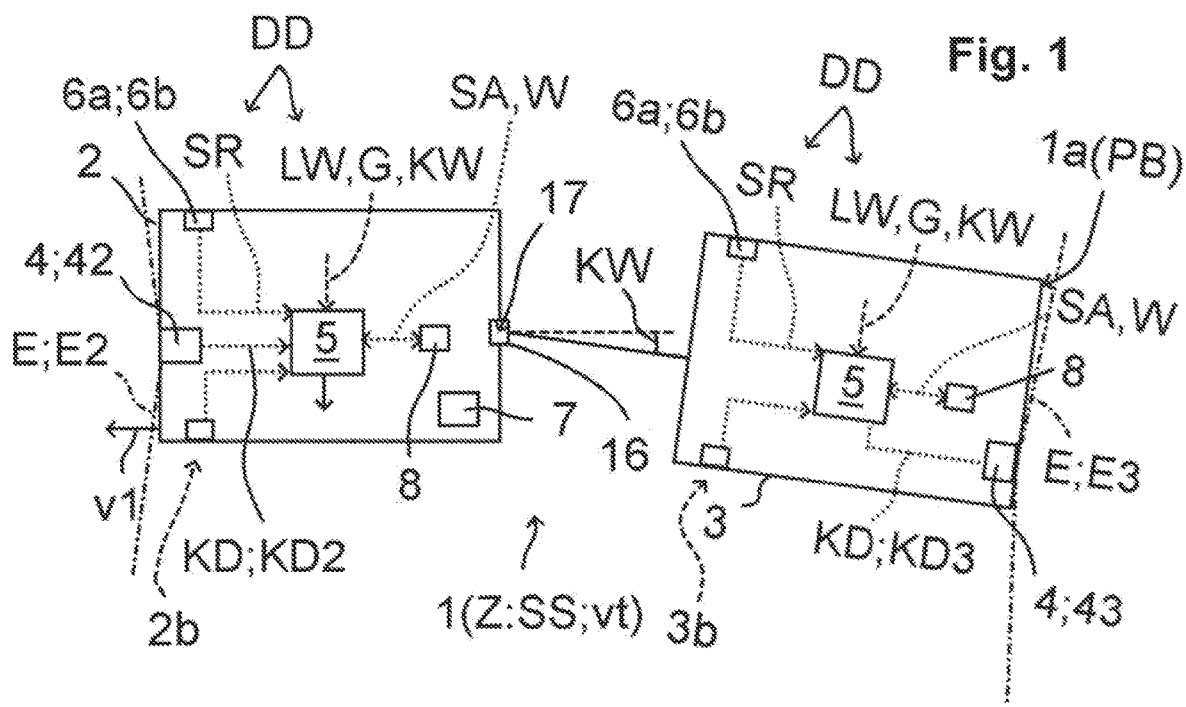
FIG. 1 shows a driving situation of a multi-part vehicle.

FIG. 1 schematically shows a multi-part vehicle 1 including a towing vehicle 2 and a trailer 3, wherein according to the embodiment shown, a camera 4 with a detection range E is arranged on both vehicle parts 2, 3. On the towing vehicle 2 a towing vehicle camera 42 with a towing vehicle detection range E2 is arranged, and on the trailer 3 a trailer camera 43 with a trailer detection range E3 is arranged. The cameras 4, 42, 43 each output camera data KD, KD2, KD3.

Figure 1A:
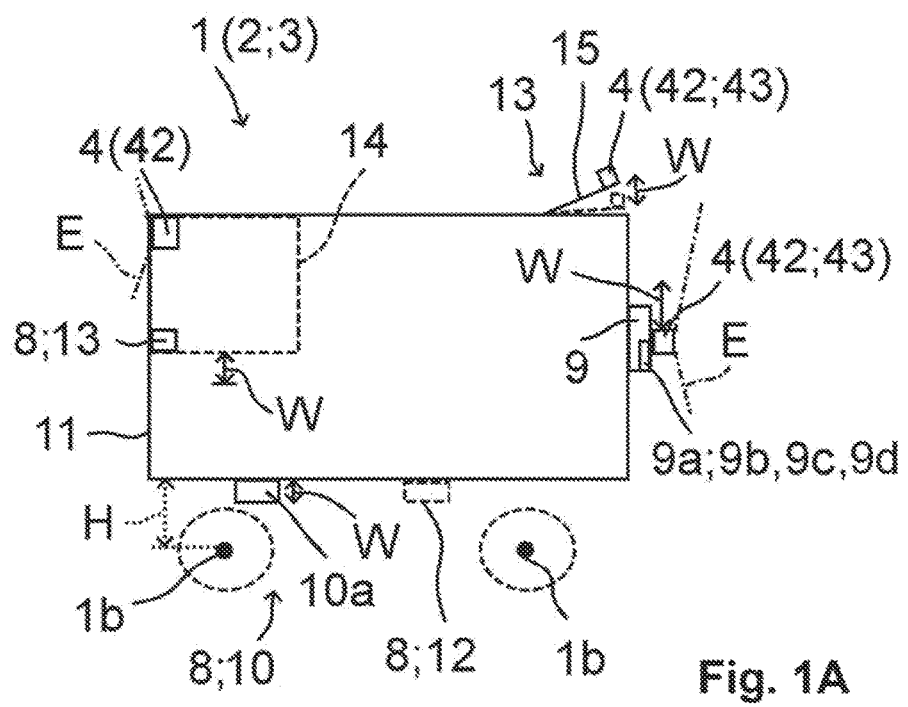
FIG. 1A shows a detailed view of the multi-part vehicle.

The vehicle 1 can be a multi-part vehicle, as shown in FIG. 1, for example as a truck-and-trailer combination with a truck and drawbar trailer or turntable trailer, or as an articulated truck with a semi-trailer tractor and semi-trailer. In principle, however, the vehicle 1 can be only a one-part vehicle, as shown in FIG. 1A. The alignment of the camera 4 is selected depending on the respective application.

Figure 2A:
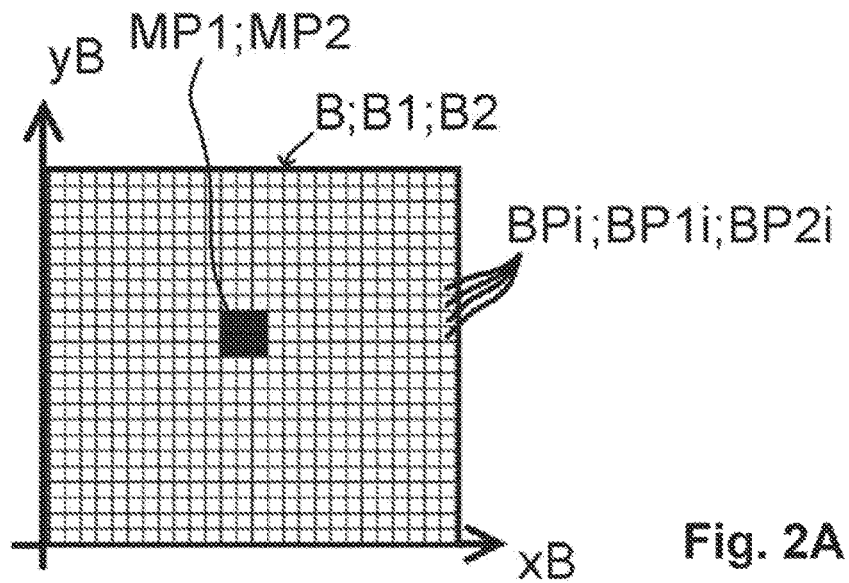
FIG. 2A shows an image captured by the camera.

The respective sets of camera data KD, KD2, KD3 are generated depending on an environment U around vehicle 1, to which the respective detection range E, E2, E3 is aligned. From each set of camera data KD, KD2, KD3 one image B can be created from pixels BPi with image coordinates xB, yB (see FIG. 2A), wherein each pixel BPi is assigned an object point PPi in the environment U (see FIG. 2B). The object points PPi belong to objects O, which are located in the environment U and to which specific absolute object coordinates xO, yO, zO in space can be assigned. Depending on the position SP of the respective camera 4, 42, 43, object points PPi of an object O are displayed on different pixels BPi or with different image coordinates xB, yB in the images B.

The camera data KD, KD2, KD3 of each respective camera 4, 42, 43 is transmitted to a control unit 5 which is configured to determine object information OI as a function of the camera data KD, KD2, KD3 and as a function of the selected odometry data DD of the vehicle 1, which relate to the current driving situation of the vehicle 1 or the part vehicles 2, 3 and thus also characterize the movement of the camera 4, by means of a triangulation T generally known to the person skilled in the art. The object information OI indicates in particular spatial features of the respective object O in the environment U that is detected by the cameras 4, 42, 43.

For example, the object information OI used can include the absolute object coordinates xO, yO, zO (world coordinates) of the object O in space, and/or a distance A between a reference point PB, for example a rear side 1a of the vehicle 1 (in the case of a one-part vehicle 1) or of the trailer 3 (for a multi-part vehicle 1) or a current position SP of the respective camera 4, 42, 43, and the detected object O, or an object point PPi on the object O or a quantity correlated with it, and/or an object form OF or object contour OC, which is divided, for example, into n different object classes OKn, and/or an object dynamics OD, that is, a temporal movement of the detected object O in space.

Figure 2B:
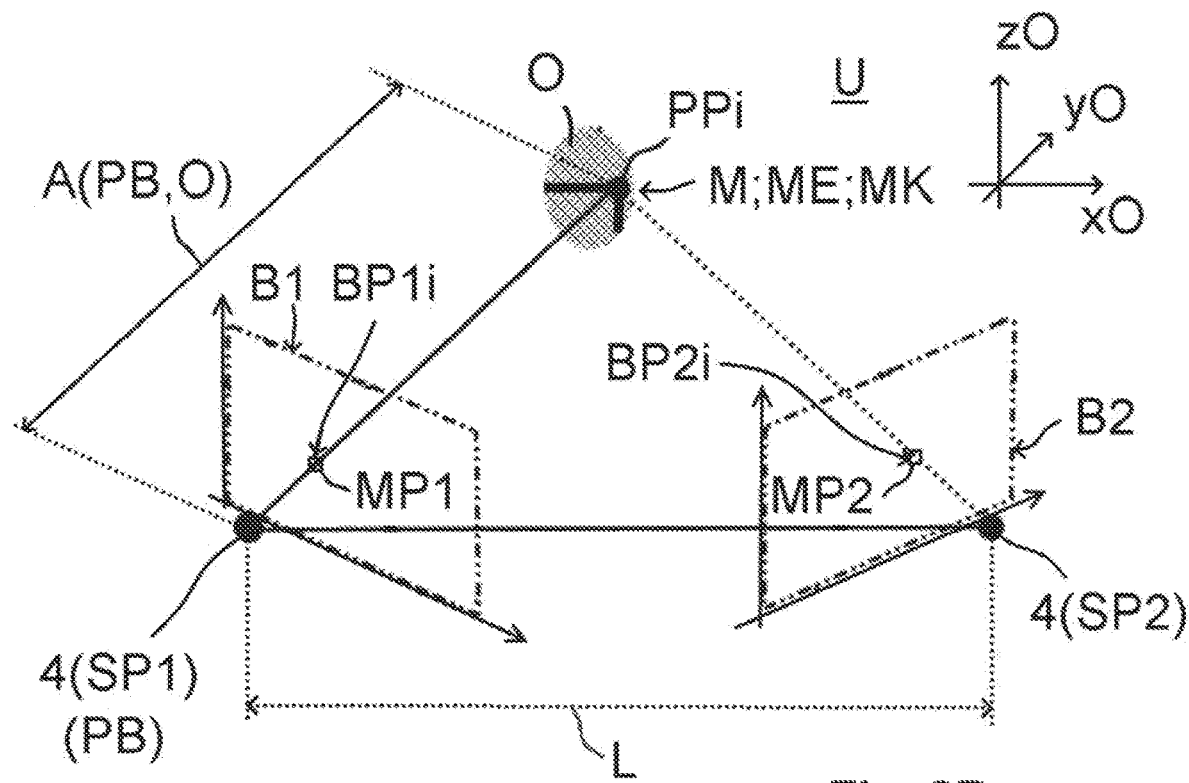
FIG. 2B shows the capture of an object point with a camera from different positions; and,
FIG. 3 shows a flow diagram of the method according to the invention.
Figure 3:
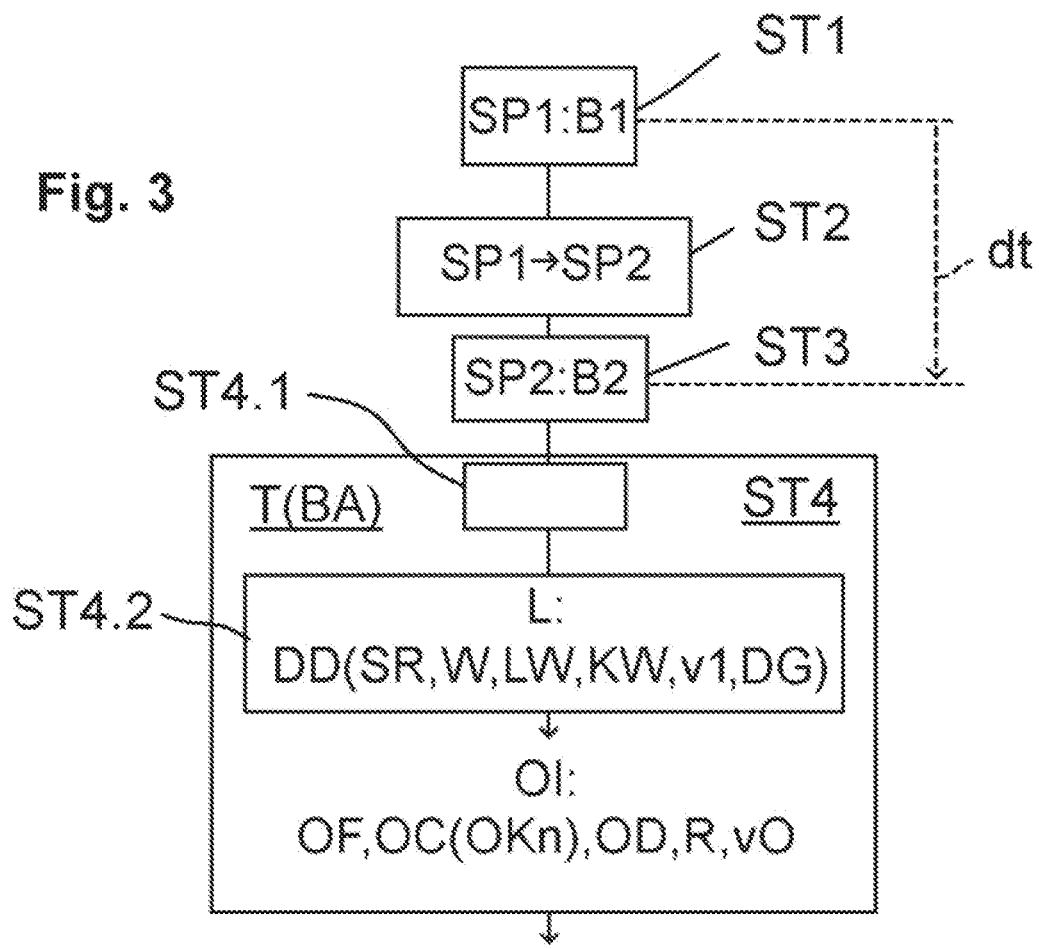

The object information OI is determined in accordance with the structure-from-motion (SfM) procedure, in which in substeps ST1, ST2, ST3 (see FIG. 3) an object O is captured by a camera 4 from at least two different positions SP1, SP2 (see FIG. 2B). By triangulation T, in a further step ST4, depth information relating to the object O or the respective object information OI can be obtained. As described in FIG. 2B, image coordinates xB, yB are determined for at least one first pixel BP1i in the first image B1 and for at least one second pixel BP2i in the second image B2, which are each assigned to the same object point PPi (ST4.1).

In order to simplify the process, a certain number of pixels BP1i, BP2i in the respective image B1, B2 can be combined in a feature point MP1, MP2 (see FIG. 2A), wherein the pixels BP1i, BP2i to be combined are selected in such a way that the respective feature point MP1, MP2 is assigned to a specific, uniquely locatable feature M on the object O (see FIG. 2B). For example, the feature M can be a corner ME or an edge MK on the object O, which can be extracted from the entire images B1, B2 and the pixels BP1i, BP2i of which can be combined in the feature points MP1, MP2.

In an approximation, an object form OF or an object contour OC can be at least estimated by triangulation T from the image coordinates xB, yB of the individual pixels BP1i, BP2i or the feature points MP1, MP2 which are assigned to the same object points PPi or the same feature M in the at least two images B1, B2. For this purpose, the image coordinates xB, yB of a plurality of pixels BP1i, BP2i or a plurality of feature points MP1, MP2 can be subject to a triangulation T to obtain object coordinates xO, yO, zO, which are not necessarily located on the object O in space, however.

Without the knowledge of an exact base length L, that is, a distance between the different positions SP1, SP2 of the camera 4, the triangulation T results in object coordinates xO, yO, zO in unscaled form. This means that only an unscaled object form OF or object contour OC can be derived from object coordinates xO, yO, zO determined in this way, but this is sufficient for determining the shape or the contour. For the triangulation T, any base length L can be assumed.

In order to enable the additional above-mentioned object information OI to be determined by means of triangulation T, the actual base length L is additionally used. If, according to FIG. 2B, the relative positions and thus the base length L between the different positions SP1, SP2 of the camera 4 at which the two images B1, B2 were acquired are known or have been determined, then the absolute object coordinates xO, yO, zO (world coordinates) of the object O or the object point PPi or the feature M can be determined by triangulation T. From this, in turn the distance A between the reference point PB and the detected object O or an object point PPi on the object O can be determined, wherein the coordinates of the reference point PB in the world coordinates follow directly from geometrical considerations.

In this way, the control unit can estimate an object contour OC or object form OF that is scaled relative to the above case if the exact object coordinates xO, yO, zO of a plurality of object points PPi or features M are determined. From the object contour OC, the object O can in turn be classified into a specific object class OKn. This process can also take into account the object dynamics OD, for example, a movement direction R of the object point or points PPi and/or an object speed vO, if the object points PPi are observed in a temporally resolved manner.

For example, objects O recognized as persons can be classified in a first object class OK1. Objects O such as signs, loading ramps, houses, et cetera, can be classified in a second object class OK2 as fixed objects. Objects O, such as other vehicles, can be classified in a third object class OK3 as moving objects.

In order to determine the determined object information OI even more precisely it can be additionally provided that more than two images B1, B2 are acquired and evaluated by triangulation T as described above, and/or that a bundle adjustment BA is also carried out.

As already described, for the SfM procedure the object O must be observed by the camera 4 from at least two different positions SP1, SP2, as shown schematically in FIG. 2B. For this purpose, the camera 4 must be moved into the different positions SP1, SP2 in a controlled manner in the substep ST2 and, in the scaled case, determined on the basis of odometry data DD, which results in base length L from this movement between the points SP1, SP2 (ST4, ST4.2). Different approaches can be applied to this problem:

If the entire vehicle 1 is in motion, then this alone will result in a movement of the camera 4. This means that the vehicle 1 in its entirety is actively set in motion, for example by a drive system 7, or passively, for example by a downward slope. If the camera 4 acquires at least two images 1, B2 within a temporal offset dt during this movement, the base length L can be determined using odometry data DD, from which the vehicle movement and thus also the camera movement can be derived. Odometry is thus used to determine the two positions SP1, SP2 assigned to the images B1, B2.

The odometry data DD can be formed, for example, by wheel speed signals SR from active and/or passive wheel speed sensors 6a, 6p on the wheels of the vehicle 1 (see FIG. 1). Depending on the temporal offset dt, it is possible to determine from these how far the vehicle 1 or the camera 4 has moved between the positions SP1, SP2, from which the base length L follows. However, it is not necessary to use only the vehicle odometry, that is, the assessment of the vehicle movement on the basis of motion sensors on the vehicle 1. A visual odometry can also be used as a supplement or alternative. In the case of visual odometry, a camera position can be determined continuously from the camera data KD of the camera 4 or from information in the acquired images B; B1, B2, provided, for example, object coordinates xO, yO, zO of a specific object point PPi are known, at least initially. The odometry data DD can also contain a dependency on the camera position determined in this way, since the vehicle movement between the two positions SP1, SP2, or even the base length L directly, can be derived from this data.

In order to make the odometric determination of the base length L during a movement of the vehicle 1 more accurate, additional odometry data DD available in the vehicle 1 can be used. For example, a steering angle LW and/or a yaw rate G can be used to also take into account the rotational movement of the vehicle 1.

In the case according to the invention, in a two-part or multiple-part vehicle 1 in which a triangulation T is to be carried out on the basis of images B acquired by the trailer camera 43, a bending angle KW between the towing vehicle 2 and the trailer 3 is additionally used to take account of the exact dynamics of the trailer 3, in particular during maneuvering or cornering operations. In order to precisely determine the individual positions SP1, SP2 of the trailer camera 43 or the base length L, how the trailer has moved in relation to the towing vehicle 2 within the period dt is also taken into account.

It is preferable to measure the bending angle KW via an active bending angle sensor 16 which is located at a coupling point 17. The two vehicle parts 2, 3 pivot around each other at this coupling point 17. On a semi-trailer, this coupling point 17 is located in the kingpin, for example. On a drawbar trailer, the coupling point is on the trailer coupling on the towing vehicle 2. In addition to an active measurement of the bending angle KW, it is also possible to determine the bending angle KW from the images B of a camera 4, for example a backward-looking towing vehicle camera 42 and/or a forward-looking trailer camera 43.

A bending angle KW determined in this way or in a different way can then be taken into account in the odometry data DD in order to obtain the base length L for the triangulation T, so that the extraction of the depth information of the object O detected by the trailer camera 43 can be carried out more accurately.

If the one-part vehicle 1 or the multi-part vehicle 1 with its vehicle parts 2, 3 is not moving, or if the movement within the time offset dt is so small that the odometry data DD is so inaccurate that it cannot provide a reliable determination of the base length L, then the camera 4 can also be set in motion by means of an active actuator system 8 in sub-step ST2. The movement of the camera 4 which is effected by the actuator system 8 differs from the movement of the vehicle 1 observed so far, in particular in that the actuator system 8 only sets in motion the camera 4 or a vehicle section connected to the camera 4. The movement of the vehicle 1 in its entirety or a driving condition Z of the vehicle 1 are not changed by this, so that a stationary vehicle 1 remains at a standstill SS during an active control of the actuator system 8.

The actuator system 8 is controlled by the control unit 5 via actuator signals SA. This can occur, for example, if the control unit 5 detects that the odometry data DD characterizing the movement of the entire vehicle 1, that is, the wheel speed signals SR and/or the steering angle LW and/or the yaw rate G and/or the camera data KD and/or transmission data DG, which allow the estimation of a vehicle speed v1 from a transmission speed and the engaged gear, are not accurate or detailed enough to determine the base length L. This can be the case if the standstill SS of the vehicle 1 has been detected or if a vehicle speed v1 is lower than a speed threshold vT.

When the actuator system 8 is activated, the camera 4 is moved directly or indirectly and thus placed at different positions SP1, SP2 so that the environment U can be captured in at least two different images B1, B2. This allows the SfM procedure to be performed as described above. In order to determine the base length L in this case, the control unit 5 uses an adjustment distance W by which the camera 4 is moved between the two positions SP1, SP2 by the actuator system 8. The adjustment distance W is transferred to the control unit 5 by the actuator system 8. The control unit 5 can also take the adjustment distance W of the actuator unit 8 into account in the odometry data DD in order to determine the base length L.

Different systems in the vehicle 1 can be considered for use as actuator systems 8, which are shown schematically in FIG. 1A for a one-part vehicle 1, but which can also be used on part vehicles 2, 3 of multi-part vehicles 1. For example, the camera 4 can be mounted on a camera adjustment system 9 with one or more actuator motor(s) 9a or pneumatic cylinder(s) 9b or hydraulic cylinder(s) 9c or electric servo cylinder(s) 9d or similarly operating actuators, with the camera adjustment system 9 being mounted on the vehicle 1 in such a way that the detection range E is aligned as desired. In this case, the camera 4 can be moved into the different positions SP1, SP2 by adjusting the actuator motor(s) 9a, pneumatic cylinder 9b, hydraulic cylinder 9c, servo cylinder(s) 9d by a specific adjustment distance W when actuated.

Another possibility for an active actuator system 8 is an active air suspension system 10 (ECAS, Electronically Controlled Air Suspension), which in a one-part vehicle 1 or in a multi-part vehicle 1 in a towing vehicle 2, or even in a trailer 3, uses air springs 10a configured as air-spring bellows to ensure that a vehicle body 11 is adjusted in its height H with respect to the vehicle axles 1b, 2b, 3b of the vehicle 1 or the towing vehicle 2 or the trailer 3, that is, can be raised or lowered. For this purpose, a pressure in the air springs 10a can be selectively adjusted. This can be used to achieve optimum suspension independently of road conditions or load conditions to dynamically compensate for a change in axle load distribution, to avoid rolling or tilting during cornering, or to adjust the height H of the vehicle body 11 when coupling a towing vehicle 2 to a trailer 3 and during loading and unloading operations, for example on a loading ramp.

If the respective camera 4, 42, 43 is arranged on the vehicle body 11 of the vehicle 1 or the towing vehicle 2 or the trailer 3, a selective control of the active air spring system 10 by the control unit 5 can be used to effect an adjustment of the camera 4, preferably its height H, by an adjustment distance W in order to position it at two different positions SP1, SP2. Since the adjustment distance W is known to the active air spring system 10 and/or can be measured, this distance can also be transmitted to the control unit 5 so that it can take the adjustment distance W effected by the active air spring system 10 into account in the odometry data DD in order to determine the base length L.

In this way, the control unit 5 can instruct the active air spring system 10 to adjust the respective camera 4 when the vehicle 1 is at a standstill SS, thus providing a further means that can be used in an SfM procedure to determine the respective object information OI for at least one object point PPi by triangulation T. In principle, the control unit 5 can also even specify the adjustment distance W as the target value which the active air spring system 10 is instructed to set by changing the pressure in the air springs 10a. However, in order to determine the object form OF or the object contour OC unscaled by triangulation T, the adjustment distance W (or the base length L) can also be disregarded, for example if the adjustment distance W is not or cannot be measured.

In addition to an active air suspension system 10, any comparable active suspension adjustment system 12 can also be used as the additional active actuator system 8, provided it is able to adjust the height H of the vehicle body 11 and thus to position the camera 4 arranged on it at two different positions SP1, SP2 in a targeted manner. However, the active actuator system 8 can also be formed by a component adjustment system 13 which can only raise or lower a part or component of the vehicle body 11 to which the camera 4 is attached, for example a driver's cab 14, by the adjustment distance W. Other possible components include aerodynamic components 15, such as aerodynamic fins or spoilers, on which a camera 4 can be mounted and which can be actively adjusted to selectively reposition the camera 4 by an adjustment distance W.

This means that there are a number of possible ways to position the camera 4 actively and selectively at different positions SP1, SP2, in order to acquire two images B1, B2 of an object O and from these to determine the respective object information OI (scaled or unscaled) for one or more object points PPi. In principle, the adjustment distance W, which is induced via the active actuator system 8, can also be combined with the odometry data DD produced by the vehicle movement, for example the bending angle KW. For example, the active actuator system 8 can also be controlled while driving in order to generate an additional movement of the camera 4.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

1 Vehicle
1a rear side of the vehicle 1
1b Vehicle axle of the vehicle 1
2 Towing vehicle
2b Vehicle axis of the towing vehicle 2
3 Trailer
3b Vehicle axle of the trailer 3
4 Camera
42 Towing vehicle camera
43 Trailer camera
5 Control unit
6a active wheel speed sensor
6p passive wheel speed sensor
7 Drive system
8 active actuator system
9 Camera positioning system
9a Actuator motor
9b pneumatic cylinder
9c hydraulic cylinder
9d electric servo cylinder
10 active air suspension system (ECAS)
10a air springs
11 Vehicle body
12 Suspension positioning system
13 Component positioning system
14 Driver's cab
15 aerodynamic component
16 active bend angle sensor
17 Coupling point
A Distance
B Image
B1 first image
B2 second image
BA bundle adjustment
BP1 Pixels
BP1i first pixel
BP2i second pixel
DD Odometry data
DG Transmission Data
dt temporal offset
E Detection range of the camera
E2 first detection range of the towing vehicle camera
E3 second detection range of the trailer camera
G Yaw rate
H Height of the vehicle body
KD Camera data of the camera
KD2 first camera data of the towing vehicle camera
KD3 second camera data of the trailer camera
L Base length
LW Steering angle
M Feature
MP1, MP2 Feature point
ME Corner (as a feature)
MK Edge (as a feature)
O Object
OC Object contour
OD Object dynamics
OF Object form
OI Object information
OKn nth object class
PB Reference point
PPi Object Point
R Direction of motion
SA Actuator signal
SP Position of the camera 4
SP1 first position of the camera
SP2 second position of the camera
SR Wheel speed signals
SS Standstill
T Triangulation
U Environment of the vehicle 1
v1 Vehicle speed
vO Object speed
vt Speed threshold
W Adjustment distance
Z Driving condition

What is claimed is:

1. A method for determining object information of an object in an environment of a multi-part vehicle having at least one towing vehicle, at least one trailer, and at least one trailer camera being arranged on the trailer in a position, the method comprising:

capturing the environment with the at least one trailer camera from a first position and, in dependence thereon, generating a first image having a plurality of first pixels;

changing the position of the at least one trailer camera;

capturing the environment with the at least one trailer camera from a second position and, in dependence thereon, creating a second image having a plurality of second pixels;

determining object information relating to the object in the captured environment by:

selecting at least one first pixel in the first image and at least one second pixel in the second image such that they are assigned to a same object point of the object in the captured environment; and, determining object coordinates of the object point from first image coordinates of the at least one first pixel and from second image coordinates of the at least one second pixel by triangulation assuming a base length between the first position and the second position of the trailer camera, the base length between the two positions being determined based on odometry data of the vehicle, wherein the odometry data characterize an adjustment of the trailer camera between the first position and the second position; and, wherein at least one of: the odometry data include a bending angle between the at least one trailer and the at least one towing vehicle; and, the odometry data is dependent on the bending angle in order to increase an accuracy of determining the base length between the first position and the second position of the trailer camera.

2. The method of claim 1, wherein the bending angle is determined via an active bending angle sensor at a coupling point between the at least one towing vehicle and the at least one trailer.

3. The method of claim 1, wherein the bending angle is determined in dependence upon images captured by a camera on at least one of the at least one towing vehicle and the at least one trailer.

4. The method of claim 1, wherein the object coordinates for a plurality of object points are determined from the first image and the second image by triangulation and an object contour.

5. The method of claim 4, wherein the object is divided into object classes via the object contour.

6. The method of claim 1, wherein an object form is determined from a plurality of object points.

7. The method of claim 6, wherein the object is divided into object classes via the object form.

8. The method of claim 1, wherein a plurality of trailer cameras are provided and object information relating to the object is determined via each trailer camera independently.

9. The method of claim 8 further comprising plausibility checking the object information determined by the plurality of trailer cameras.

10. The method of claim 1, wherein more than two images are acquired at different positions and from each acquired image, pixels are selected which are assigned to the same object point of the object in the captured environment, wherein object coordinates of the assigned object point are determined from the image coordinates of the selected pixels by triangulation assuming a base length between the respective positions of the at least one trailer camera.

11. The method of claim 1 further comprising performing a bundle adjustment via the first image and the second image.

12. The method of claim 1, wherein a plurality of first pixels in the first image are combined into a first feature point and a plurality of second pixels in the second image are combined into a second feature point, the first feature point and the second feature point being selected in such a way that they are assigned to a same feature of the object in the captured environment; and wherein object coordinates of the assigned feature are determined from first image coordinates of the first feature point and from second image coordinates of the second feature point by triangulation, assuming a base length between the two positions of the trailer camera.

13. A method for determining object information of an object in an environment of a multi-part vehicle having at least one towing vehicle, at least one trailer, and at least one trailer camera being arranged on the trailer in a position, the method comprising:

capturing the environment with the at least one trailer camera from a first position and, in dependence thereon, generating a first image having a plurality of first pixels;

changing the position of the at least one trailer camera;

capturing the environment with the at least one trailer camera from a second position and, in dependence thereon, creating a second image having a plurality of second pixels;

determining object information relating to the object in the captured environment by:

selecting at least one first pixel in the first image and at least one second pixel in the second image such that they are assigned to a same object point of the object in the captured environment; and, determining object coordinates of the object point from first image coordinates of the at least one first pixel and from second image coordinates of the at least one second pixel by triangulation assuming a base length between the first position and the second position of the trailer camera, the base length between the two positions being determined based on odometry data of the vehicle, wherein the odometry data characterize an adjustment of the trailer camera between the first position and the second position:

wherein at least one of: the odometry data include a bending angle between the at least one trailer and the at least one towing vehicle; and, the odometry data is dependent on the bending angle; and, wherein the odometry data are additionally generated depending on an adjustment distance; and, the at least one trailer camera is adjusted by the adjustment distance by controlling an active actuator system on the trailer without changing a driving condition of the vehicle.

14. The method of claim 13, wherein at least one of:

a camera adjustment system is controlled as the active actuator system, the active actuator system including at least one of a plurality of actuating motors, a plurality of pneumatic cylinders, a plurality of hydraulic cylinders, and a plurality of electric servo cylinders, the at least one trailer camera being fixed directly to the camera adjustment system so that when the camera adjustment system is controlled the at least one trailer camera is adjusted by the adjustment distance to change the position of the at least one trailer camera;

an active air suspension system with air springs or a chassis adjustment system is controlled as the active actuator system, wherein by controlling the active air suspension system or the chassis adjustment system, a vehicle body of the trailer is adjusted in height by the adjustment distance so that the at least one trailer camera fixed to the vehicle body of the trailer is adjusted indirectly by the adjustment distance to change the position of the at least one trailer camera; and, a component adjustment system is controlled as the active actuator system, wherein by controlling the component adjustment system, a component of the trailer is adjusted by the adjustment distance so that the at least one trailer camera attached to this component is adjusted indirectly by the adjustment distance to change the position of the at least one trailer camera.

15. The method of claim 14, wherein the determined object information, which follows from an adjustment of the trailer camera by the adjustment distance via the active actuator system, is plausibility checked with object information which follows from the odometry data of the vehicle, which is selected from a group including at least one of: a wheel speed signal, a vehicle speed, a steering angle, a bending angle, and transmission data.

16. The method of claim 13, wherein a camera adjustment system is controlled as the active actuator system, the active actuator system including at least one of a plurality of actuating motors, a plurality of pneumatic cylinders, a plurality of hydraulic cylinders, and a plurality of electric servo cylinders; and, the at least one trailer camera is fixed directly to the camera adjustment system so that when the camera adjustment system is controlled, the at least one trailer camera is adjusted by the adjustment distance to change the position of the at least one trailer camera.

17. The method of claim 13, wherein a component adjustment system is controlled as the active actuator system, wherein by controlling the component adjustment system, a component of the trailer is adjusted by the adjustment distance so that the at least one trailer camera attached to this component is adjusted indirectly by the adjustment distance to change the position of the at least one trailer camera.

18. The method of claim 17, wherein the component of the trailer is an aerodynamic component.

19. A control unit for determining object information of an object in an environment of a multi-part vehicle having at least one towing vehicle, at least one trailer, and at least one trailer camera being arranged on the trailer in a position, the control unit comprising:
- a processor;
- a computer-readable storage medium having program code stored thereon;
- said program code being configured, when executed by the processor, to:
- capture the environment with the at least one trailer camera from a first position and, in dependence thereon, generate a first image having a plurality of first pixels;
- change a position of the at least one trailer camera;
- capture the environment with the at least one trailer camera from a second position and, in dependence thereon, create a second image having a plurality of second pixels;
- determine object information relating to the object in the captured environment by:
- selecting at least one first pixel in the first image and at least one second pixel in the second image, by selecting the first pixel and the second pixel such that they are assigned to a same object point of the object in the captured environment; and,
- determining object coordinates of the object point from first image coordinates of the at least one first pixel and from second image coordinates of the at least one second pixel by triangulation assuming a base length between the first position and the second position of the at least one trailer camera, the base length between the two positions being determined based on odometry data of the vehicle, wherein the odometry data characterizes an adjustment of the at least one trailer camera between the first position and the second position;

wherein at least one of the odometry data includes a bending angle between the at least one trailer and the at least one towing vehicle and the odometry data is dependent on the bending angle in order to increase an accuracy of determining the base length between the first position and the second position of the trailer camera.

20. A multi-part vehicle comprising:
- a towing vehicle;
- a trailer;
- at least one trailer camera arranged on said trailer;
- said towing vehicle and said trailer defining a bending angle;
- a control unit for determining object information of an object in an environment of the multi-part vehicle;
- said control unit having a processor and a computer readable storage medium having program code stored thereon;
- said program code being configured, when executed by the processor, to capture the environment with the at least one trailer camera from a first position and, in dependence thereon, generate a first image having a plurality of first pixels;
- change a position of the at least one trailer camera;
- capture the environment with the at least one trailer camera from a second position and, in dependence thereon, create a second image having a plurality of second pixels;
- determine object information relating to the object in the captured environment by:
- selecting at least one first pixel in the first image and at least one second pixel in the second image, by selecting the first pixel and the second pixel such that they are assigned to a same object point of the object in the captured environment; and, determining object coordinates of the object point from first image coordinates of the at least one first pixel and from second image coordinates of the at least one second pixel by triangulation assuming a base length between the first position and the second position of the at least one trailer camera, the base length between the two positions being determined based on odometry data of the vehicle, wherein the odometry data characterizes an adjustment of the at least one trailer camera between the first position and the second position; and,
- wherein at least one of the odometry data includes the bending angle between the at least one trailer and the at least one towing vehicle and the odometry data is dependent on the bending angle in order to increase an accuracy of determining the base length between the first position and the second position of the trailer camera.

* * * * *